No. 706,076. Patented Aug. 5, 1902.
G. A. LUTZ.
FLEXIBLE CONDUIT OR TUBE.
(Application filed Nov. 20, 1901.)
(No Model.)

WITNESSES:
C. W. Benjamin
M. Manning

INVENTOR
Geo. A. Lutz,
BY
F. F. Bourne
his ATTORNEY

United States Patent Office.

GEORGE A. LUTZ, OF BROOKLYN, NEW YORK, ASSIGNOR OF ONE-HALF TO THOMAS E. QUINN, OF NEW YORK, N. Y.

FLEXIBLE CONDUIT OR TUBE.

SPECIFICATION forming part of Letters Patent No. 706,076, dated August 5, 1902.

Application filed November 20, 1901. Serial No. 82,981. (No model.)

*To all whom it may concern:*

Be it known that I, GEORGE A. LUTZ, a citizen of the United States, and a resident of New York city, borough of Brooklyn, State of New York, have invented certain new and useful Improvements in Flexible Conduits or Tubes, of which the following is a specification.

The object of my invention is to provide a flexible conduit or tube particularly adapted to contain electrical conductors, wherein the conduit or tube may be bent around corners or angles or as may be desired, and in carrying out my invention I take a single strip of flexible material, such as metal, and on opposite sides of the longitudinal center or median line thereof I provide grooves or depressions, preferably of a concavo-convex form in cross-section, and wind such strip spirally, so that the groove or depression on one side of the median line of the strip will register with or lap the groove or depression on the opposite side of the median line of an adjacent spiral winding, whereby the interlocked grooves or depressions will serve to prevent undue lengthwise elongation of the conduit or tube, while at the same time will permit the latter to flex or bend laterally, so that conductors may be carried therethrough at different angles and around corners.

Reference is to be had to the accompanying drawings, forming part hereof, wherein—

Figure 1:
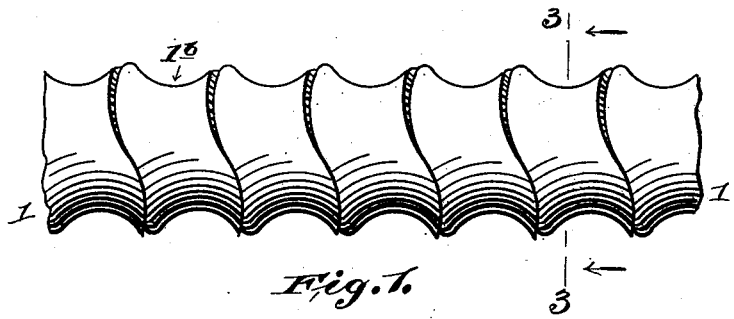
Figure 2:
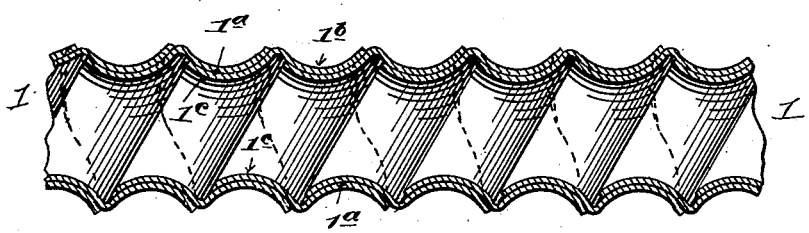
Figure 3:
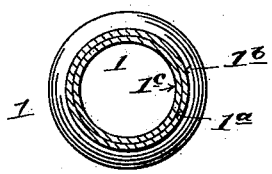

Figure 1 is a side view of a conduit or tube embodying my improvements. Fig. 2 is a longitudinal section thereof, and Fig. 3 is a cross-section on the line 3 3 in Fig. 1.

In the accompanying drawings, in which similar numerals of reference indicate corresponding parts in the several views, the numeral 1 indicates a flexible strip, preferably of suitable metal, adapted to be wound spirally, and on the opposite sides of the longitudinal center or median line of such strip the same is provided with grooves or depressions 1ª 1ᵇ, which preferably extend longitudinally along the strip side by side. In Figs. 1 and 2 the grooves or depressions are shown as similarly arranged—that is to say, said grooves or depressions have concave surfaces exposed outwardly, the corresponding convex surfaces 1ᶜ thus being on the inner side. The strip so formed is then wound spirally, so that the groove or depression on one side of the central or median line laps the groove or depression on the opposite side of the median line of the adjacent spiral winding, whereby the opposed sides or edges of the strip become interlocked, as clearly shown in Fig. 2. To accomplish this overlapping and interlocking of the opposed sides of the strip, the windings are made comparatively close, whereby throughout most of the length of the conduit or tube the walls of the same are of substantially double the thickness of the strip itself.

The overlapping interlocking sides or edges of the single strip 1 serve to prevent undue lengthwise elongation or stretching of the conduit or tube and yet permit the same to be bent laterally to pass around corners and angles and to follow other lines, while at the same time the corresponding sides or edges of the strip remain overlapped and interlocked, as the grooved sides of the strip are enabled to slide relatively for a short distance one upon the other.

My improved conduit or tube is particularly adapted to contain one or more electrical conductors, and the conduit is strong and serviceable and comparatively cheap to manufacture. Furthermore, it will be observed that the bore of the conduit or tube presents a smooth surface to the passage of a conductor capable of being drawn therethrough, as no sharp edges extend in such position as to encounter and injure the insulation upon such conductor.

While I have shown a single groove or depression on each side of the central or median line of the single strip, it will be understood that my invention is not limited to such an arrangement, as the strip could have more than two grooves or depressions adapted to interlock when the strip is wound spirally.

Having now described my invention, what I claim is—

1. A conduit or tube of the character described comprising a spirally-wound strip having grooves or depressions on opposite sides of the central or median line, the groove or depression of one convolution on one side of the strip lapping and interlocking with the groove or depression on the opposite side of the strip of the next convolution, substantially as described.

2. A conduit or tube of the character described comprising a spirally-wound strip having longitudinally-extending grooves or depressions, the groove or depression on one side of the strip lapping and interlocking with the groove or depression on the opposite side of the strip, substantially as described.

3. A conduit or tube of the character described comprising a spirally-wound strip having similarly-disposed grooves or depressions on opposite sides of the central or median line, the groove or depression on one side of the strip lapping and interlocking with a similar groove or depression on the opposite side of the strip, substantially as described.

4. A conduit or tube of the character described comprising a spirally-wound strip having longitudinally-disposed grooves or depressions on opposite sides of the central or median line, said grooves or depressions having their concave surfaces facing outwardly, the convex surface of one side of the strip meshing with the concave surface of the opposite side of the strip, substantially as described.

GEO. A. LUTZ.

Witnesses:
M. MANNING,
T. F. BOURNE.